United States Patent
Welling

(10) Patent No.: US 6,283,378 B1
(45) Date of Patent: Sep. 4, 2001

(54) DATA CARRIER WHICH CAN BE OPERATED WITHOUT CONTACT

(75) Inventor: Ando Welling, Isen (DE)

(73) Assignee: Giesecke & Dervrient GmbH, Munich (DE)

( * ) Notice: Subject to any disclaimer, the term of this patent is extended or adjusted under 35 U.S.C. 154(b) by 0 days.

(21) Appl. No.: 09/462,496
(22) PCT Filed: Jul. 24, 1998
(86) PCT No.: PCT/EP98/04651
§ 371 Date: May 5, 2000
§ 102(e) Date: May 5, 2000
(87) PCT Pub. No.: WO99/05647
PCT Pub. Date: Feb. 4, 1999

(30) Foreign Application Priority Data

Jul. 24, 1997 (DE) .............................................. 197 31 983

(51) Int. Cl.$^7$ ...................................................... G06K 19/06
(52) U.S. Cl. ............................................ 235/492; 235/487
(58) Field of Search .................................... 235/487, 492

(56) References Cited

U.S. PATENT DOCUMENTS 5,147,210 * 9/1992 Patterson et al. .................... 235/492

FOREIGN PATENT DOCUMENTS

2279611 * 1/1995 (GB) .

* cited by examiner

Primary Examiner—Harold I. Pitts
(74) Attorney, Agent, or Firm—Bacon & Thomas, PLLC

(57) ABSTRACT

The invention relates to a data carrier (1) having an integrated circuit (7) and at least one insulating supporting substrate (10) on which a transfer element (2) for transferring data to an external device is disposed. The integrated circuit (7) can alternatively be mounted in the data carrier (1) directly or packed in an electronic module (4). For establishing an electric connection between the integrated circuit (7) or electronic module (4) and the transfer element (2), the data carrier (1) has electroconductive surfaces (3, 17) opposite the two main faces of the electronic module (4) or integrated circuit (7). The electroconductive surfaces (3, 17) are connected with the opposing contact surfaces (5) of the electronic module (4) or the contacts (8) of the integrated circuit (7) and connected in pairs with the electroconductive surfaces (3, 17) disposed on the other side of the electronic module (4) or integrated circuit (7). Each pair of electroconductive surfaces (3, 17) is further electrically connected with the transfer element (2). The transfer element (2) can be formed as a printed coil, the coil ends (3) being widened and each forming one of the electroconductive surfaces (3, 17) of each pair.

10 Claims, 2 Drawing Sheets

DATA CARRIER WHICH CAN BE OPERATED WITHOUT CONTACT

BACKGROUND OF THE INVENTION

This invention relates to a data carrier having an integrated circuit and at least one insulating supporting substrate on which a transfer element is disposed for transferring data to an external device, and to a method for producing such a data carrier.

A data carrier of the abovementioned kind is known from EP 0 756 244 A2 whose disclosure is taken as a basis for the further description. EP 0 756 244 A2 describes a circuit unit having an insulating supporting substrate on which a conductive flat coil is located. The coil can consist of a plurality of coil layers separated by insulating layers. In order to interconnect the individual coil layers into a coil, each of the insulating layers has at least one hole. The coil ends can be connected with an integrated circuit or an electronic module containing the integrated circuit solely if the coil ends touch the terminals of the integrated circuit or the contacts of the module. The individual turns of the coil can be so disposed and dimensioned that the circuit unit is embossable without restriction within an area specified by the standard.

It is especially important for perfect operation of the data carrier that the electric connection between the transfer element, which can be formed for example as a coil, and the integrated circuit, which is optionally mounted in the data carrier in the form of an electronic module, be reliable throughout the life of the data carrier.

It is therefore the problem of the invention to design the structure of the data carrier in such a way as to ensure a lastingly reliable electric connection between the transfer element and the integrated circuit or electronic module.

SUMMARY OF THE INVENTION

This problem is solved by the feature combinations of the independent claims.

The essential aspect of the invention is that the data carrier is formed so as to permit double-sided contacting, i.e. contacting of both main faces of the integrated circuit or the electronic module containing the integrated circuit, with the transfer element.

This manner of contacting has the advantage of eliminating the effort of a soldering process or of metering conductive adhesive for contacting, while nevertheless achieving a very reliable and long-lived electric connection between transfer element and electronic module or integrated circuit. Whenever the contacts of the integrated circuit or electronic module come away from the transfer element on one side as a result of bending stress or other effects, thereby worsening the electric connection, the exactly opposite effect occurs on the other side of the integrated circuit or electronic module so as to compensate the adverse effects. The described motion causes the transfer element to be pressed against the contacts of the integrated circuit or electronic module on the opposite side of the integrated circuit or electronic module, so that the electric connection between integrated circuit or electronic module and transfer element is at least not clearly worsened or even improved. This ensures that the electronic data carrier still works reliably even upon strong bending stress.

Furthermore, regardless of the cause for detachment of the transfer element from one or more contacts of the electronic module or integrated circuit, the redundant design of the connecting points reduces the risk of a resulting disruption of service. The described compensation or redundancy effect presupposes, however, that the electronic module or integrated circuit used has contacts which are accessible from both main faces, or two sets of contacts which are redundant relative to each other, one set being disposed on each main face. This is already the case in particular with so-called lead-frame modules wherein the integrated circuit is disposed on a thin metal frame. The invention can therefore be used especially advantageously in conjunction with lead-frame modules.

However, the invention also offers advantages with electronic modules or integrated circuits which are only contactable via one of the two main faces. In this case one also gains an additional degree of freedom for producing the data carrier since the transfer element is contactable in different mounting positions of the electronic module or integrated circuit.

A further advantage of the invention is that, starting out from the data carrier known from EP 0 756 244 A2, the above-described improvement of the electric connection between transfer element and integrated circuit or electronic module can be obtained by the relatively simple measure of double-sided contacting, which can be realized without introducing a new technique into the production process and thus hardly increases production costs.

The transfer element is preferably printed on insulating layers of the data carrier in the form of a coil, the screen printing technique being especially well suited.

The invention will be explained below with reference to the drawings. A chip card is selected here as an embodiment for the data carrier, and a printed coil for the transfer element. The data carrier can of course also be designed differently and be integrated for example into a key or another object of daily use. For the transfer element one can also use an electrostatic coupling surface for example.

DETAILED DESCRIPTION

Figure 1:
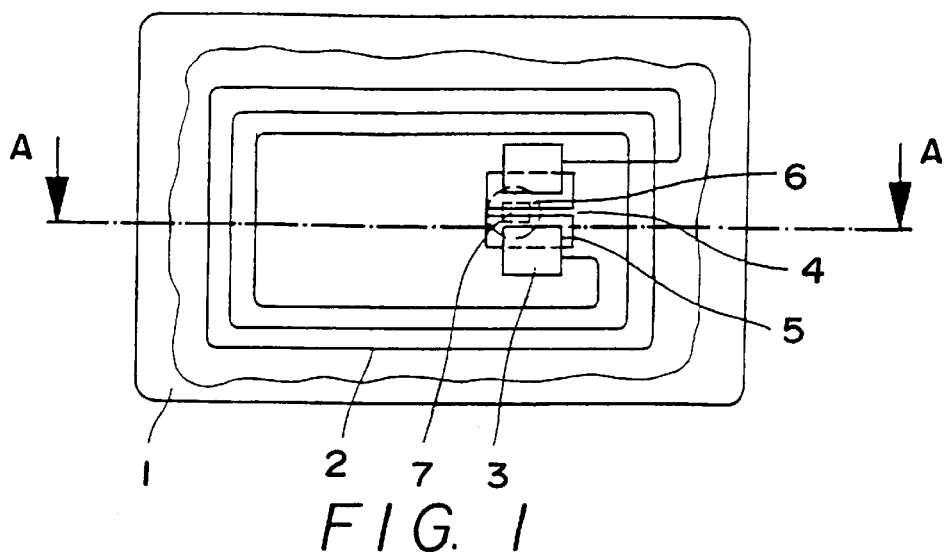
FIG. 1 shows an embodiment of the inventive chip card wherein the integrated circuit is embedded in the card body in the form of an electronic module, in a plan view.

FIG. 1 shows an embodiment of the inventive chip card wherein the integrated circuit is packed in an electronic module, in a plan view. Chip card 1 is designed for non-contacting data exchange with an external device and fulfills ISO standard 7810 with respect to its outer dimensions. Within an area limited by a wavy line one sees a view of the inner structure of chip card 1. For clarity's sake the individual card layers are not shown but rather only the components embedded in or between the layers. These components consist in particular of coil 2 whose ends 3 are greatly widened in order to establish an optimal electric contact with electronic module 4 in which integrated circuit 7 is embedded. Integrated circuit 7 is covered by casting body 6 and electrically connected with contact surfaces 5 of electronic module 4. Electronic module 4 is preferably formed as a lead-frame module wherein metallic contact surfaces 5 serve as a supporting substrate for integrated circuit 7 together with casting body 6. Contact surfaces 5 are each electrically connected with widened ends 3 of coil 2 in each case. Further, the backs of contact surfaces 5 are connected with electroconductive surfaces 17, which are not visible in FIG. 1 since they come to lie under coil ends 3. Each of electroconductive surfaces 17 is in addition connected with one coil end 3.

Coil 2 including widened coil ends 3 as well as electroconductive surfaces 17 are preferably produced by printing technology. One produces the electric connection between coil ends 3 or electroconductive surfaces 17 and contact surfaces 5 by connecting the individual layers constituting chip card 1 and carrying coil 2 or electronic module 4 into a card body by lamination, so that coil ends 3 or electroconductive surfaces 17 and contact surfaces 5 now lastingly touch each other. This contact between coil ends 3 or electroconductive surfaces 17 and contact surfaces 5 can be established alternatively at a time when printed coil ends 3 or electroconductive surfaces 17 are totally dried off or at a time when the drying process is not yet over. According to the invention, contact surfaces 5 are connected with coil ends 3 on each side. As explained above, this cannot be seen in FIG. 1 since electroconductive surfaces 17, which are connected with the back of contact surfaces 5, come to lie exactly under coil ends 3 shown and are therefore not visible. The inventive contacting technology is clearly recognizable in FIGS. 3 to 6, however, and will be described in detail with reference to these figures.

Figure 2:
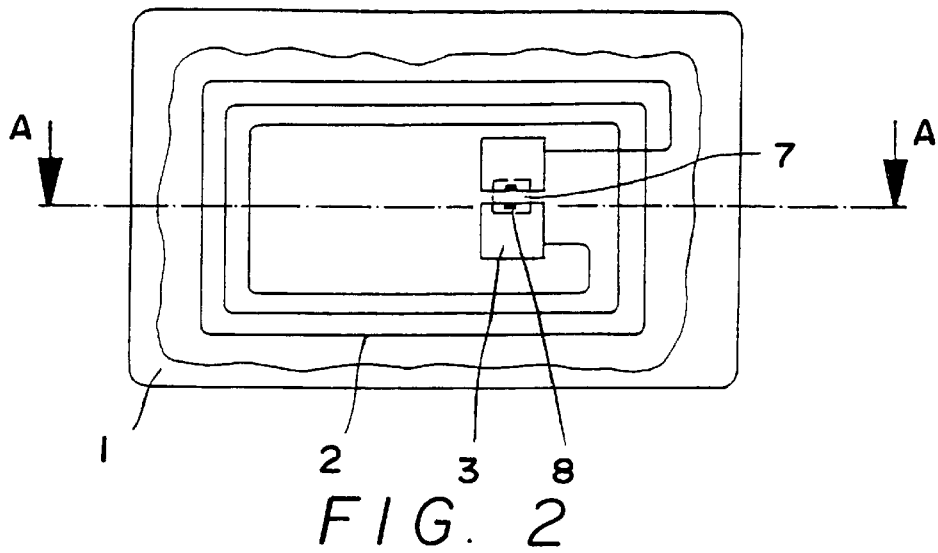
FIG. 2 shows a further embodiment of the inventive chip card wherein the integrated circuit is embedded in the card body directly, in a plan view.

FIG. 2 shows a further embodiment of inventive chip card 1 which differs from FIG. 1 only in that integrated circuit 7 is not packed in electronic module 4 but embedded directly in the card body. On its surface, integrated circuit 7 has contacts 8 which are in touching connection with coil ends 3. As in FIG. 1, coil ends 3 are additionally connected in the embodiment of FIG. 2 with electroconductive surfaces 17 which are again connected with contacts 8 disposed on the back of integrated circuit 7.

Figure 3:
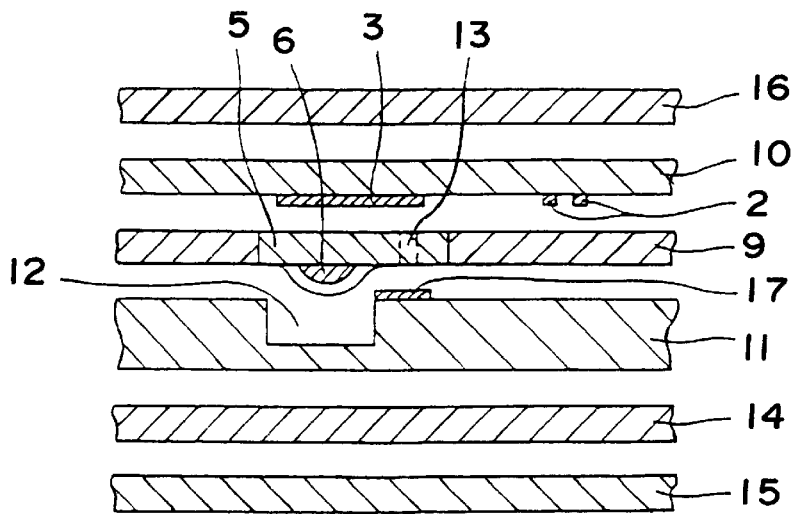
FIG. 3 shows a layer structure of the chip card shown in FIG. 1 before lamination, in cross section along line A—A.

FIG. 3 shows the layer structure of chip card 1 shown in FIG. 1 before lamination of the individual layers, in cross section along line A—A. In the embodiment shown in FIG. 3 chip card 1 consists of six individual layers. Electronic module 4 is disposed in layer 9 in such a way that contact surfaces 5 of electronic module 4 come to lie in a recess of layer 9 and casting body 6 protrudes beyond layer 9. On each side of layer 9 there are layers 10 and 11. Layer 10 carries printed coil 2 including coil ends 3, whereby coil ends 3 come to lie opposite contact surfaces 5 of electronic module 4. Layer 11 is disposed on the side of layer 9 beyond which casting body 6 protrudes and contains recess 12 for receiving casting body 6. Instead of recess 12, layer 11 can also have a perforation completely penetrating layer 11. Further, layer 11 carries electroconductive surfaces 17 which can be electrically connected with coil ends 3 disposed on layer 10 via at least one plated-through hole 13 in layer 9. Toward the outside of the card, layer 11 is followed by another layer 14 and finally cover layer 15. Layer 10 is followed toward the outside of the card by cover layer 16. The layer structure can vary within wide limits depending on the area of use. In particular one can dispense with cover layers 15 and 16 or layers 10 and 14. All layers can consist of the materials customarily used in chip cards, for example PVC, ABS, PETG, polycarbonate, etc.

Figure 4:
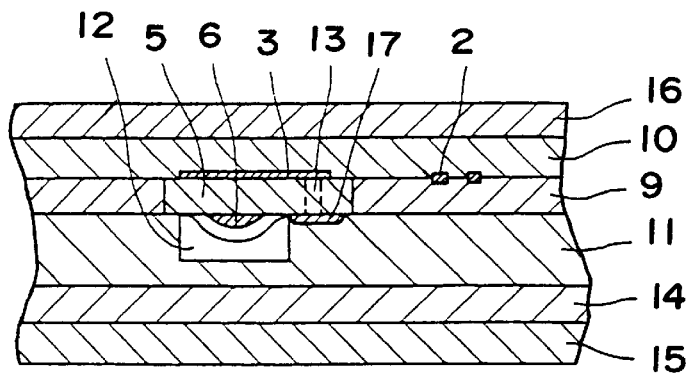
FIG. 4 shows the chip card shown in FIG. 1 in cross section along line A—A.

FIG. 4 shows chip card 1 shown in FIG. 1 in cross section along line A—A. Chip card 1 shown in FIG. 4 was produced by laminating the stack of single layers shown in FIG. 3. Before the layers are stacked they are provided with the components shown in FIG. 3, such as coil 2 together with widened coil ends 3, electroconductive surfaces 17, plated-through holes 13 and electronic module 4. FIG. 4 clearly shows the inventive double-sided contacting of contact surfaces 5 of electronic module 4 through coil ends 3 and electroconductive surfaces 17. The electric connection between coil ends 3 and contact surfaces 5 is established by the laminating process. Coil ends 3 are thereby pressed against the upper side of contact surfaces 5, and electroconductive surfaces 17 are electrically connected with coil ends 3 by at least one plated-through hole 13 in each case and pressed against the lower side of contact surfaces 5. This procedure achieves double-sided contacting of contact surfaces 5 so that a reliable electric connection between coil 2 and integrated circuit 8 is ensured even when coil ends 3 are detached from contact surfaces 5 for example as a result of bending stress on chip card 1. In this case the electric contact is still maintained through electroconductive surfaces 17.

A further effect of double-sided contacting is that one can use electronic modules 4 of different constructions for chip card 1 shown in FIG. 4, it being irrelevant whether contacting of electronic module 4 is possible only from the upper side, only from the lower side or on both sides. In case electronic modules 4 are only contactable on one side, one of course does not have the advantage of higher reliability of the electric connection as with double-sided contacting. However, the card structure shown in FIG. 4 offers the advantage over conventional card structures with one-sided contacting that the card structure can be used for different electronic modules 4 in an unchanged form.

Figure 5:
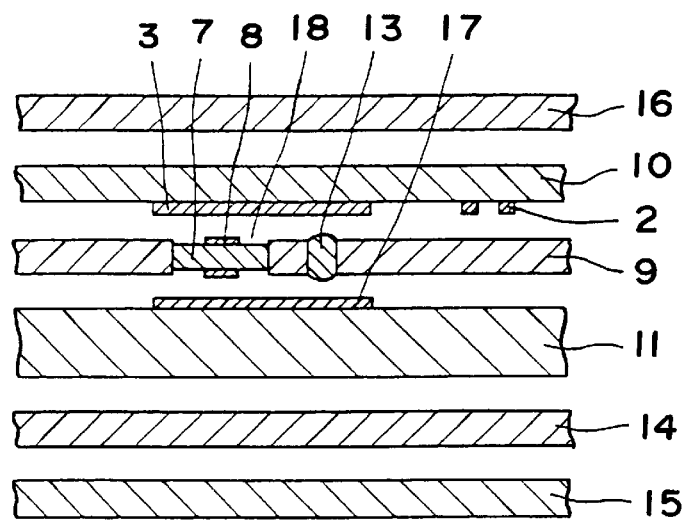
FIG. 5 shows a layer structure of the chip card shown in FIG. 2 before lamination, in cross section along line A—A.

FIG. 5 shows the layer structure of chip card 1 shown in FIG. 2 before lamination of the individual layers, in cross section along line A—A. The layer sequence corresponds to the layer sequence shown in FIG. 3 but layers 9 and 11 are modified. According to FIG. 5 layer 9 has hole 18 in which integrated circuit 7 is embedded. Further, layer 9 has at least one plated-through hole 13. In contrast to FIG. 3, layer 11 shown in FIG. 5 has no recess 12 and only carries electroconductive surfaces 17 disposed opposite contacts 8 of integrated circuit 7 and opposite the at least one plated-through hole 13 in each case. Analogously to FIG. 3, layer 10 carries coil 2 and coil ends 3 disposed opposite contacts 8 of integrated circuit 7 pointing in their direction and opposite the at least one plated-through hole 13 in each case.

Figure 6:
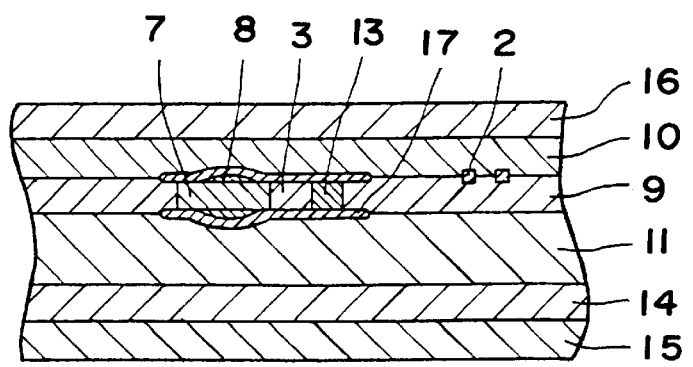
FIG. 6 shows the chip card shown in FIG. 2 in cross section along line A—A.

FIG. 6 shows chip card 1 shown in FIG. 2, which was produced by laminating the layer stack shown in FIG. 5, in cross section along line A—A. The laminating process causes coil ends 3 to be pressed against the at least one plated-through hole 13 in each case and against contacts 8 of integrated circuit 7 facing them, thereby creating electroconductive connections. On the opposite side of layer 9 electroconductive surfaces 17 are pressed against contacts 8 of integrated circuit 7 facing them and against the at least one plated-through hole 13 in each case, so that electroconductive connections likewise arise here. Altogether, lamination causes coil ends 3 to be connected with electroconductive surfaces 17 via the at least one plated-through hole 13, and both coil ends 3 and electroconductive surfaces 17 to be electrically connected with contacts 8 of integrated circuit 7 facing them in each case.

In the embodiment of inventive chip card 1 shown in FIG. 6, double-sided contacting also, on the one hand, has the effect of low sensitivity to bending stress or other stresses which may lead to contact problems and, on the other hand, offers a universal mounting possibility for integrated circuit 7 which can also carry contacts 8 on only one side and can then alternatively be mounted so that contacts 8 point toward layer 10 or toward layer 11.

The layer sequence shown in the described embodiments is to be regarded as only one of many possibilities. Thus, any other layer structures can similarly be used for realizing the inventive idea. The essential thing is that double-sided contacting of electronic module 4 or integrated circuit 7 is possible or that, as an alternative thereto, electronic modules 4 or integrated circuits 7 having contact surfaces 5 or contacts 8 on only one side can alternatively be mounted in such a way that contact surfaces 5 or contacts 8 point alternatively to one or the other main face of the chip card.

Coil 2 can also be applied alternatively to a single layer on one or both sides or be distributed over a plurality of layers.

In a modification of the invention, coil 2 is applied partly to layer 10 and partly to layer 11. The two coil parts are interconnected through at least one plated-through hole in layer 9. Layers 10 and 11 each carry one coil end 3 and one electroconductive surface 17 which is connected with coil end 3 of other layer 11 or 10 via at least one plated-through hole 13 in layer 9 in each case.

In a further modification of the invention, at least part of coil 2, coil ends 3 and/or electroconductive surfaces 17 is applied to layer 9 having electronic module 4 or integrated circuit 7, whereby the arrangement of the individual components in the card can be retained.

What is claimed is:

1. A contactlessly operated data carrier (1) having
   at least one transfer element (2) for exchanging data contactlessly with an external device, and
   an electronic module (4) having contact surfaces (5) for establishing an electric connection with the transfer element (2) and containing an integrated circuit (7) which delivers or processes the data,
   characterized in that
      the data carrier (1) has electroconductive surfaces (3, 17) adjacent the two main faces of the electronic module (4) and substantially opposite each other,
      the electroconductive surfaces (3, 17) of the data carrier (1) are electrically connected with the opposing contact surfaces (5) of the electronic module (4) in each case,
      the electroconductive surfaces (3, 17) of the data carrier (1) are electrically interconnected in pairs by means of plated-through holes (13), and
      each pair of electroconductive surfaces (3, 17) is electrically connected with the transfer element (2).

2. A contactlessly operated data carrier (1) having
   at least one transfer element (2) for exchanging data contactlessly with an external device, and
   an integrated circuit (7) which delivers or processes the data and has contacts (8) for establishing an electric connection with the at least one transfer element (2),
   characterized in that
      the data carrier (1) has electroconductive surfaces (3, 17) opposite the two main faces of the integrated circuit (7) and substantially opposite each other,
      the electroconductive surfaces of the data carrier (1) are electrically connected with the opposing contacts (8) of the integrated circuit (7) in each case,
      the electroconductive surfaces (3, 17) of the data carrier (1) are electrically interconnected in pairs by means of plated-through holes (13), and
      each pair of electroconductive surfaces (3, 17) is electrically connected with the transfer element (2).

3. A data carrier according to claim 1, characterized in that the electronic module (4) has contact surfaces (5) on both main faces which are interconnected in pairs.

4. A data carrier according to claim 1, characterized in that the contact surfaces (5) of the electronic module (4) are continuous between the two main faces of the electronic module (4).

5. A data carrier according to claim 1, characterized in that at least part of the electroconductive surfaces (3, 17) is part of the at least one transfer element (2).

6. A data carrier according to claim 1, characterized in that the transfer element (2) is a printed coil.

7. A data carrier according to claim 1, characterized in that the electroconductive surfaces (3, 17) are applied by printing technology.

8. A data carrier according to claim 1, characterized in that the data carrier is a chip card.

9. A method for producing a data carrier (1) comprising the steps of
   incorporating an electronic module (4) having an integrated circuit (7) and contact surfaces (5), or an integrated circuit (7) having contacts (8), into a first layer (9),
   applying electroconductive surfaces (17) to a second layer (11),
   applying a transfer element (2) and further electroconductive surfaces (3) to at least one third layer, the electroconductive surfaces (3) being part of the transfer element (2) or being electrically connected with the transfer element (2),
   disposing the stated layers in a stack, the first layer (9) with the electronic module (4) coming to lie between the second layer (11) and the at least one third layer (10),
   laminating the stack into a compound, an electric contact being established between the contact surfaces (5) of the electronic module (4) and the particular opposing electroconductive surfaces (3, 17), and.
   a contact (13) is further established between the electroconductive surfaces (3, 17), the second layer (11) and the third layer (10).

10. A method according to claim 9, characterized in that the transfer element (2) and/or the electroconductive surfaces (3, 17) are not applied to the second layer (11) and/or the at least one third layer (10), but to the side opposite the particular layer (11, 10) in the stack, of the first layer (9) into which the electronic module (4) is incorporated.

* * * * *